March 12, 1935. I. H. PEIRCE 1,994,323
COFFEE EXTRACTING DEVICE
Filed Aug. 27, 1930 2 Sheets-Sheet 2
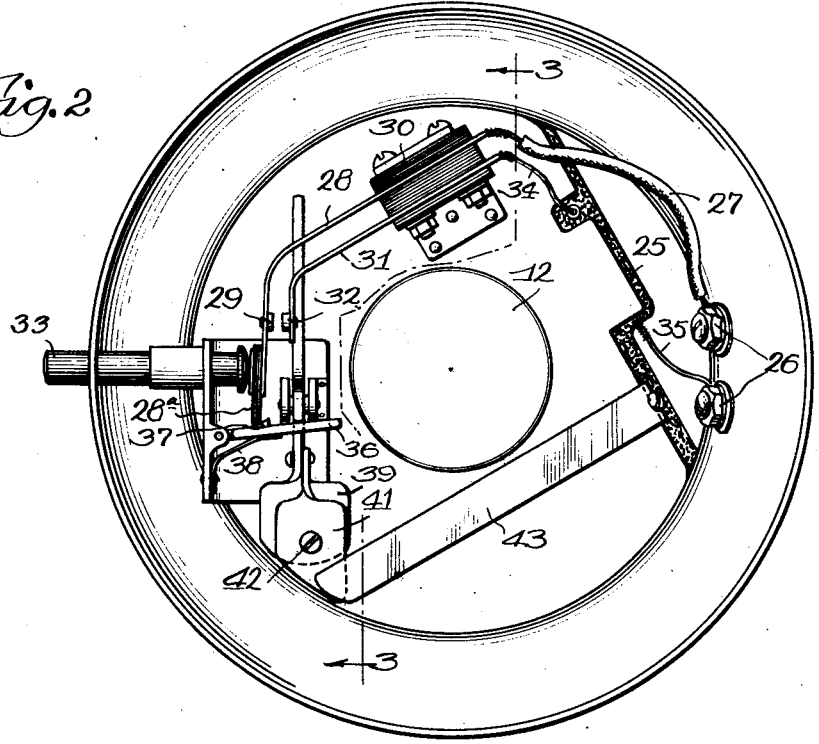
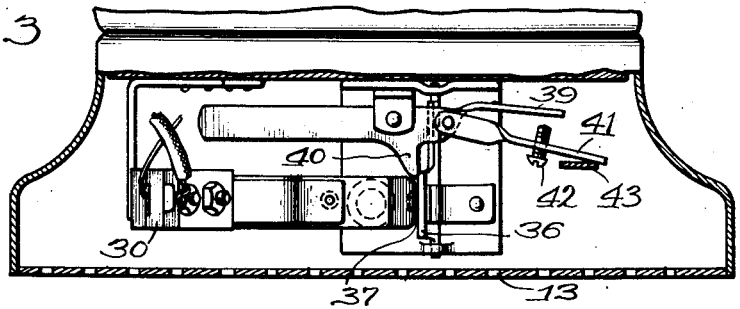
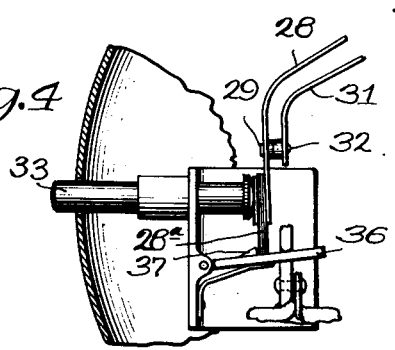 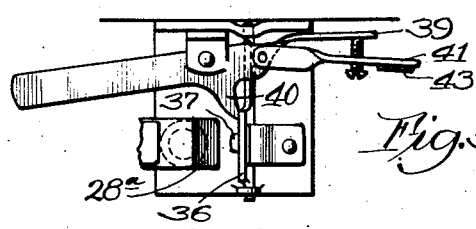
Witness:
Chas. R. Kursh
Inventor,
Inez H. Peirce
Benj. T. Borahouse Atty.

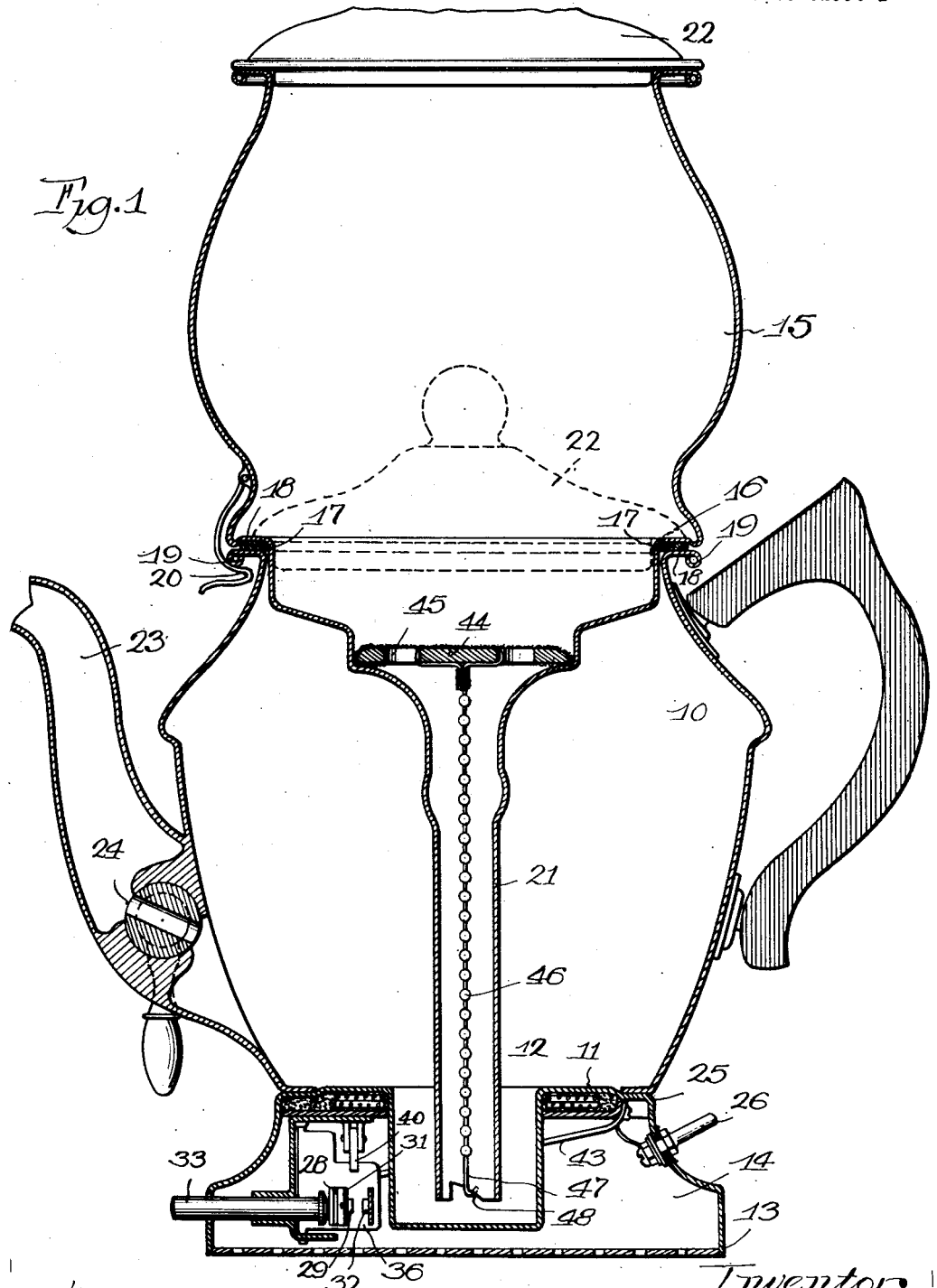

Patented Mar. 12, 1935

1,994,323

UNITED STATES PATENT OFFICE 1,994,323

COFFEE EXTRACTING DEVICE

Inez H. Peirce, Chicago, Ill.

Application August 27, 1930, Serial No. 478,082

11 Claims. (Cl. 219—43)

My present invention relates to improvements in coffee extracting devices, and more particularly to the class of coffee extracting apparatus in which the water is placed in the pot and the suitably prepared or ground coffee beans placed in a receptacle associated with the pot and above the water, the receptacle and the pot being so formed and associated that the steam which forms by the boiling of the water in the pot will force the water into the receptacle containing the coffee beans, and upon the discontinuance of the heating operation the water flows back into the pot, together with the substances which it has extracted from the coffee beans.

The object of my invention has been to so arrange a coffee pot, coffee bean receptacle, means for supplying heat and means for controlling the heat supply so that the heating operation may be simply started and will be automatically terminated at the proper time without in any way depending upon the attention or memory of the person operating the device.

I have attained the aforementioned objects and results by means of the apparatus illustrated in the accompanying drawings, in which—

Fig. 1 is a central, vertical section through the coffee extracting apparatus.

Fig. 2 is a bottom plan with the bottom plate removed.

Fig. 3 is a section on line 3—3 of Fig. 2.

Fig. 4 is a detail plan of the switch and latch structure, and

Fig. 5 is a detail elevation of the latch releasing lever.

Similar reference characters have been employed to designate similar parts throughout the respective views.

The pot element 10 of the coffee pot may be made in a number of divers shapes or sizes, and differs from the body of an ordinary coffee pot principally in having centrally of the bottom 11 a depression or well 12. The sides of the pot 10 are continued downwardly beyond the bottom 11, and are secured to a bottom plate 13 so as to provide a compartment 14, in the base below the bottom 11 and around the well 12.

The coffee bean containing element consists of a body portion 15 provided with an annular shoulder 16, with an annular depression therein 17, in which annular depression is mounted a gasket 18, proportioned and adapted to seat upon the upper edge of the pot member, which upper edge is rolled or beaded, as at 19. Latches 20 are provided upon the outer surface of the member 15, which engage the top rim and bead on the pot. At the center of the bottom of the member 15 is provided a tube 21 which extends downwardly into and adjacent the bottom of the well 12. The top of the member 15 is of the same shape and size as the top of the pot 10, so as to accommodate a cover 22, which will permit the cover to be removed from the member 15 and the withdrawal of the member 15 from the pot 10 and the replacement of the cover upon the pot 10.

The pot 10 is provided with the usual spout 23, which, however, differs from the usual coffee spout in that it contains a hand operated valve 24 which may be closed to render the pot steam tight and opened to permit the flow of the coffee.

It will be appreciated from the foregoing description that when the water in the pot 10 is boiled the accumulation of steam in the top of the pot over surface of water will force the boiling water upwardly through the tube 21 into the member 15 where it comes into contact with the ground coffee beans contained therein. Upon discontinuing the boiling of the water in the pot and the condensation of the steam in the pot, the water flows back from the member 15, through the tube 21, into the pot 10 from which it may be drawn by manually opening the valve 24.

To heat the contents of the pot 10 I provide an annular electrically energized heating element 25 which seats about the well 12 closely adjacent the bottom 11. Extending from the base of the pot, but insulated therefrom, are two electrical connector posts 26, 26. From one of the posts 26 a conductor 27 runs to an arc-shaped spring switch blade 28, provided with a contact disk 29. The switch blade 28 is secured to an insulating block 30, which also carries another arc-shaped spring switch blade 31, which is provided with a contact disk 32. Switch blade 31 lies normally substantially parallel with the switch blade 28, but so that the contact disks 29 and 32 are normally out of contact. The spring switch blade 28 is longer than the switch blade 31. Mounted in the wall of the base of the pot is a button 33, which, when forced inwardly, causes the switch blade 28 to be pressed inwardly so that the contact disks 29 and 32 are brought into contact.

A conductor 34 runs from the switch blade 31 to a terminal of the heating element 25 and another conductor 35 runs from the opposite terminal of the heating element 25 to the second conductor post 26, whereby, when current is supplied to the conductor posts 26, 26, and the contact disks 29 and 32 are in contact, current will flow through the heating element 25. When the heating element is energized as above described, the water in the pot 10 will be caused to boil and boiling will continue until the water in the pot has been forced through the tube 21 into the member 15 and the bottom 11 of the pot is uncovered. As soon as the bottom 11 of the pot is uncovered and there is no longer boiling water to dissipate the heat therefrom, the temperature of the bottom 11 and heating element 25 rapidly rises and I avail myself of this rapid rise of temperature for securing the opening of the circuit and discontinuing of the heating by means of the apparatus now to be described.

To the unattached end of the spring switch blade 28 is secured a piece of non-conducting material 28a. Pivoted to swing at right angles to the movement of the switch blade 28 is a plate 36 from the face of which extends a substantially triangular latch or detent 37. A spring 38 presses the pivoted plate 36 and the detent carried thereby towards the end of the spring switch blade 28 so that when the spring switch blade 28 is moved towards the center of the apparatus by pressure on the button 33 the spring switch blade 28 rides up over and latches behind the detent 37. Pivoted at right angles to and below the plate 36 is a lever 39. Upon the side of the lever 39, which is under the plate 36, is provided a projection 40 which bears upon and co-operates with the face of the plate 36 adjacent the end of the switch blade 28. The end of the lever 39 has an additional parallel plate 41 which is bored and tapped to receive a screw 42 so that the additional plate 41 may be adjusted at different relations with the lever 39. Secured to the heating element 25 is a bi-metallic thermo-sensitive strip 43, which strip extends across the top of the member 41 carried by the plate 39. The thermo-sensitive strip 43 bends or flexes when heated and the screw 42 is operated to adjust the parallel member 41 so that when the thermo-sensitive element 43 is effected by the relatively high heat developed after the water has been forced from the bottom 11 of the pot the thermo-sensitive element moves the plate 39. The opposite end of the plate 39 moves to force the upstanding projection 40 against the plate 36, thereby moving the plate 36 and causing the disengagement of the detent 37 from the spring switch blade 28, which, when so disengaged, springs back into its normal position and separates the contact disks 29 and 32, thereby opening the circuit and de-energizing the heating element 25.

The presence of the well 12 in the bottom 11 into which the tube 21 extends facilitates and makes much more certain the occurrence of the cycle of operations heretofore described, as the fluid in the well is not subject to as high temperature as that immediately above the bottom 11 and is not boiled away before the heating element 25 and thermo-sensitive element 43 are sufficiently superheated to operate the switch. If no well were present and the tube 21 terminated above the plane of the bottom 11, steam would be liable to escape through the tube 21 which would interfere with the elimination of the water from above the bottom 11 and thereby interfere with the superheating of the thermo-sensitive element 43. Steam, moreover, escaping through the coffee beans in the member 15 would extract from them undesirable substances and cause other undesirable changes which impair the flavor of the extracted coffee.

It will also be noted that the spring switch blade 28 will snap away from the switch blade 31 when released from the latch or detent 37, which will prevent the arcing when the circuit is opened.

It will further be noted by reference to Fig. 1 that I position a strainer 44 preferably covered with cheese cloth 45, or other suitable fabric, in the bottom of the receptacle 15 to prevent the coffee grounds from falling or being carried into the tube 21. In order to simply secure this strainer 44 in position I secure to the under side thereof a chain 46 having on the end thereof a hook 47. The bottom of the tube 21 is cut in sufficiently to permit the hook 47 to engage the wall of the tube. This cut-in place is provided with an inclined wall 48 along which the hook may be moved to draw the strainer into position with requisite tension.

Having described my invention what I claim as new and desire to secure by Letters Patent is:

1. A coffee extracting apparatus comprising a boiler element having a well in the bottom thereof, a compartment for the reception of the ground coffee seating upon the top of said boiler element and closing the same against the escape of steam, and a tube being the only means of communication between said boiler element and the compartment for the reception of the coffee extending from the coffee compartment into said well, an electric heating element disposed adjacent the bottom of said boiler element, a circuit for energizing said electric heating element in which is interposed a switch for manually closing said circuit, a latch for maintaining said circuit in closed position and a temperature operated element disposed so as to be operated at a predetermined minimum water level in said boiler element for disengaging said latch.

2. A coffee extracting apparatus comprising a boiler element sealed against the escape of steam, a compartment for the reception of the ground coffee associated with said boiler element and a tube, being the only means of communication between said boiler element and the compartment for the reception of the coffee extending from the coffee compartment into said boiler element, an electric heating element disposed adjacent the bottom of said boiler element, a circuit for energizing said electric heating element in which is interposed a switch for manually closing said circuit, a latch for maintaining said switch in closed position and a temperature operated element disposed so as to be operated at a predetermined minimum water level in said boiler element for disengaging said latch.

3. A coffee extracting apparatus comprising a boiler element, a compartment for the reception of the ground coffee seating upon the top of said boiler element and closing the same against the escape of steam, a tube, being the only means of communication between said boiler element and the compartment for the reception of the coffee extending from the coffee compartment into said boiler element, an electric heating element disposed adjacent the bottom of said boiler element, a circuit for energizing said electric heating element in which is interposed a switch including a spring switch blade, a manually operated element for moving said spring switch blade into closed position, a spring pressed latch co-operating with said switch blade to hold the same in closed position, a lever for disengaging said latch and a heat operated element disposed so as to be operated at a predetermined minimum water level in said boiler element for moving said lever.

4. A coffee extracting apparatus comprising a boiler element, a compartment for the reception of the ground coffee seating upon the top of said boiler element and closing the same against the escape of steam, a tube, being the only means of communication between said boiler element and the compartment for the reception of the coffee extending from the coffee compartment into said boiler element, an electric heating element disposed adjacent the bottom of said boiler element, a circuit for energizing said electric heating element in which is interposed a switch including a spring switch blade, a manually operated element for moving said spring switch blade into closed position, a spring pressed latch co-operating with said switch blade to hold the same in closed position, a lever having an adjustable arm for disengaging said latch and a heat operated element responsive to the increase in temperatures resulting from the expelling of a substantial quantity of water from said boiler element into the compartment for the reception of the ground coffee co-acting with said adjustable lever arm for moving the same.

5. A coffee extracting apparatus comprising a boiler element having a well and a valve controlled spout, a compartment for the reception of the ground coffee seating upon the top of the said boiler element and closing the same against the escape of steam, a tube, being the only means of communication between said boiler element and the compartment for the reception of the coffee extending from the coffee compartment into said well, an electric heating element disposed adjacent the bottom of said boiler element, a circuit for energizing said electric heating element in which is interposed a switch for manually closing said circuit, a latch for maintaining said switch in closed position and a temperature operated element responsive to the increase in temperatures resulting from the expelling of a substantial quantity of water from said boiler element into the compartment for the reception of the ground coffee co-operating with said latch.

6. A coffee extracting apparatus comprising a boiler element, a compartment for the reception of the ground coffee seating upon the top of said boiler element and closing the same against the escape of steam, a tube, being the only means of communication between said boiler element and the compartment for the reception of the coffee extending from the coffee compartment into said boiler element, said tube having a cam sided aperture in the bottom thereof, a strainer seated in the bottom of said ground coffee receptacle, a chain extending from said strainer through said tube and a hook carried by said chain co-operating with said cam sided aperture.

7. A coffee extracting apparatus comprising a steam tight boiler element, a compartment for the reception of the ground coffee associated with said boiler element, a tube, being the only means of communication between said boiler element and the compartment for the reception of the coffee extending from the coffee compartment into the boiler element, an electric heating element disposed adjacent the bottom of said boiler element, a circuit for energizing said electric heating element, means for manually closing said circuit and temperature operated means responsive to the increase in temperatures resulting from the expelling of a substantial quantity of water from said boiler element into the compartment for the reception of the ground coffee for opening said circuit.

8. A coffee extracting apparatus comprising a boiler element sealed against the escape of steam, a compartment for the reception of the ground coffee associated with said boiler element, a tube, being the only means of communication between said boiler element and the compartment for the reception of the coffee extending from the coffee compartment into the boiler element, an electric heating element disposed in relation to said boiler element above the opening of said tube, a circuit for energizing said electric heating element, means for manually closing said circuit and temperature operated means responsive to the increase in temperatures resulting from the expelling of a substantial quantity of water from said boiler element into the compartment for the reception of the ground coffee for opening said circuit.

9. Apparatus for treating commodities with hot water comprising a boiler element sealed against the escape of steam, a compartment for the reception of the commodities to be treated associated with said boiler element, a tube, being the only means of communication between said boiler element and the compartment for the reception of the commodities extending from the commodity compartment into said boiler element, an electric heating element disposed in relation to said boiler element above the opening of said tube, a circuit for energizing said heating element, means for manually closing said circuit and temperature operated means responsive to the increase in temperatures resulting from the expelling of a substantial quantity of water from said boiler element into the compartment for the reception of the commodities for opening said circuit.

10. Apparatus for treating commodities with hot water comprising a boiler element, a compartment for the reception of the commodities to be treated associated with said boiler element, a tube, being the only means of communication between said boiler element and the compartment for the reception of the commodities extending from the commodity compartment into said boiler element, an electric heating element, a heat conducting element heated by said heating element, a strip of thermostatic metal, one end attached to said heat conducting element, the other end being free to deflect, that part of the heat conducting element which has thermostatic metal attached being mounted in relation to the boiler element, in a position above the bottom opening of the tube, whereby when the heat absorbing action of the boiling water has been reduced by the expulsion of a considerable portion of the boiling water from said boiler element to the compartment for the reception of the commodities to be treated, the increase of temperature so obtained is effective to cause said thermostatic metal to deflect.

11. An extracting apparatus comprising a boiler, a compartment for the reception of the material to be extracted associated with said boiler, a tube extending from said compartment to adjacent the bottom of said boiler, an electric heating element for heating said boiler, a circuit for energizing said electric heating element, means for manually closing said circuit, and a thermo-sensitive element responsive to the increase of temperature resulting from the forcing of a substantial quantity of the water from the boiler by the generation of steam pressure above the water therein for opening said circuit.

INEZ H. PEIRCE.